UNITED STATES PATENT OFFICE.

RICHARD WILLIAM BENDER, OF BOSTON, MASSACHUSETTS.

IMPROVEMENT IN REFINING RAW SUGAR.

Specification forming part of Letters Patent No. 115,417, dated May 30, 1871.

*To all whom it may concern:*

Be it known that I, RICHARD WILLIAM BENDER, of Boston, in the county of Suffolk and State of Massachusetts, have invented an Improvement in Refining Raw Sugar; and I do hereby declare that the following is a description of my invention sufficient to enable those skilled in the art to practice it.

This invention relates to an improvement in refining raw sugar, by which improvement I am enabled not only to produce a superior product to what has been obtained by the processes now or heretofore in practice, but to produce such product at a less cost than has been heretofore possible. In practicing my invention I first dissolve the raw sugar in water, preferably making the solution as heavy as possible, and after the addition, if necessary, of a sufficient quantity of lime-water, or milk of lime, or phosphate of soda, or other chemical equivalent, for the purpose, but preferably the phosphate of soda, (adding from one to three pounds of the salt to every thousand pounds of raw sugar,) the solution, without any filtration or settling, is then boiled down in the vacuum-pan till sufficiently concentrated for crystallization. The crystallization may be effected in the pan itself, or the concentrated sirup may be run into crystallizing-vats and left until granulation has sufficiently progressed. I have now a mixture of comparatively pure sugar crystals contained in the more impure sirup. Putting this mixture into a suitable centrifugal machine, (revolving, say, at the rate of fifteen hundred revolutions per minute,) these crystals, by the centrifugal force, are freed from the most of the sirup, or from a very large amount of it. I then apply to the crystals in the centrifugal a wash, either of pure water or water having sugar dissolved in it, which (by the revolutions of the centrifugal) will free the crystals more perfectly, producing a sugar product which I call No. 1, and a sirup product which I call No. 1. This sirup product is crystallized again and treated as before, the results obtained being called sugar product No. 2, and sirup product No. 2. Repeating the operation with successive results I obtain (dependent, of course, upon the greater or lesser strength of the original raw sugar) sugar products Nos. 3, 4, and even 5, the successive sirup products 3, 4, and even 5 growing weaker and weaker in power to crystallize, until, failing to crystallize, it is considered as molasses. By this process, or succession of processes of crystallization, I produce a much purer sugar than the original raw sugar, and collect in the molasses, by mechanical extraction, nearly the entire amount of soluble impurities (such as various kinds of uncrystallizable sugar, gums, saline matters, and nitrogenous substances) generally contained in the raw sugar, and not precipitated by the chemicals above enumerated in the first stage of the process. These foreign matters of impurities, being thus separated from the sugar, are prevented from injuring the product in the subsequent treatment. Although the sugar products 1 2 3 4 5 differ much in relative appearance and quality, yet they retain but a very slight per cent. of the above-mentioned soluble impurities, and even this percentage may be more or less decreased in the centrifugal machines. They do contain, however, all the insoluble impurities of an organic and inorganic nature, (such as sand, clay, earth, cane, trash, and coagulated albumen,) as well as the precipitates caused by the action of the phosphate of soda or other chemicals on certain substances of a slimy or glutinous character, (retarders of crystallization before precipitation, but now harmless in that respect.) I next dissolve the sugar products in water, with a view of separating from them the insoluble impurities contained therein, by filtration through cloth and other menstruums. Blood may be added to the solution to facilitate filtration through cloth, but generally there will be but little if any blood needed, as the viscid substances have been freed from the crystals and from the precipitates by the centrifugal machines, and the precipitates having obtained more consistency, by the prolonged exposure to heat in the vacuum-pan, the filtration through cloth proceeds with more facility, even without the use of blood. The filtrate now represents a cane-sugar solution of considerable purity, both fitted to preserve itself during subsequent treatment, and with less liability to loss; and the filtrate, by mere crystallization in vacuum-pans and purging in centrifugal machines, will yield a fair commercial product. I prefer, however, to give to the filtrate an additional filtration through animal charcoal or boneblack, by which treatment I produce a colorless liquor of great brilliancy, and which, in time, by recrystallization, will produce a sugar of great beauty and purity; and this result is obtained at the expense or by the use of but a very small amount of "black" in comparison to what has to be used by the refining processes now in vogue. The purging of the crystallized product can be effected in centrifugals or in molds, and, in either case, with far greater facility than the old processes of refining. The resulting sirups, being only slightly inferior in strength to the preceding liquor, can be worked up at the option of the refiner, either by returning them to the preceeding liquor, or crystallizing them by themselves.

Having thus described my process, it will be seen that my invention consists in refining sugar by subjecting the raw sugar to a preliminary and partial purification by crystallization, and purging in centrifugal machines (and, sometimes, by purging in centrifugal machines without crystallization) anterior to a more perfect and final purification, by means of solutions and mechanical filtration through cloth, boneblack, or other menstruums, and by recrystallization.

I claim—

The improvement in refining raw sugar, substantially as described.

RICHARD WILLIAM BENDER.

Witnesses:
 FRANCIS GOULD,
 M. W. FROTHINGHAM.